United States Patent [19]

Draisey

[11] Patent Number: 5,033,314

[45] Date of Patent: Jul. 23, 1991

[54] FORCE AND MOMENT SENSOR

[75] Inventor: Sherry L. Draisey, King City, Canada

[73] Assignee: Spar Aerospace Limited, Mississauga, Canada

[21] Appl. No.: 431,910

[22] Filed: Nov. 6, 1989

[51] Int. Cl.$^5$ ............................ G01L 5/16; G01L 1/26
[52] U.S. Cl. ................................ 73/862.04; 73/862.52
[58] Field of Search ............ 73/862.04, 862.05, 862.06, 73/862.52

[56] References Cited

U.S. PATENT DOCUMENTS

| | | | |
|---|---|---|---|
| 2,487,595 | 11/1949 | Ruge | 73/862.65 X |
| 3,855,857 | 12/1974 | Claycomb | 73/862.04 X |
| 3,911,737 | 10/1975 | Ormond | 73/862.65 |

FOREIGN PATENT DOCUMENTS 0213505 9/1984 Fed. Rep. of Germany ... 73/862.04

Primary Examiner—Charles A. Ruehl
Attorney, Agent, or Firm—Fetherstonhaugh & Co.

[57] ABSTRACT

The force and moment sensor of the present invention has first and second load paths for transferring forces and moments from an input member to the output member. The first and second path forming members cooperating with one another to divide the forces and moments which are transferred through the sensor whereby minor components of the moments and substantial components of the forces are transferred through the second load path forming means. Strain sensors are located in the second load path for sensing the forces and moments applied to the second load path forming members from which the total value of the forces and moments transferred from the input member to the output member may be determined while simultaneously transferring large moments and small forces.

7 Claims, 3 Drawing Sheets

FORCE AND MOMENT SENSOR

BACKGROUND OF THE INVENTION

This invention relates to force and moment sensors.

In many fields such as robotics it is necessary to determine the forces and moments which are applied by a drive member to a driven member. The most commonly used force moment sensor which is presently available has a crusiform configuration and strain guages are mounted on the arms of the crusiform so that the forces and moments applied to the sensor can be determined. The principal difficulty with this type of sensor is that all of the forces and moments which are applied to the system must pass through the sensor and in circumstances where these forces may be very high it is necessary to make the crusiform structurally strong. This has the effect of reducing the sensitivity of the sensor because the strain applied by very small forces is not readily detected. It is, therefore, necessary to compromise between the structural strength requirements of the system and the level of sensitivity which is required.

SUMMARY OF INVENTION

I have found that it is possible to overcome this difficulty by partially decoupling the sensor from the primary load path. As a result it is possible to measure large moments and small shears without sacrificing sensitivity. It is also possible to provide a structurally redundant system and to add a sensing element which is stiff yet sensitive.

It is an object of the present invention to provide a force and moment sensor which allows for the measurement of large moments as well as small shears with minimal introduction of flexibility.

It is a further object of the present invention to provide a force and moment sensor which partially decouples the sensor from the load path, the decoupling being achieved in such a fashion as to minimize the amount of moment passing through the sensor.

According to one aspect of the present invention there is provided a force moment sensor for sensing forces and moments in a system through which forces and moments are transferred from an input member to an output member comprising:

first and second load path forming means forming first and second load paths for transferring said forces and moments from the input member to the output member, said first and second path forming means cooperating with one another to divide the forces and moments which are transferred through the sensor whereby minor components of the moments and substantial components of the forces are transferred through the second load path forming means, and strain sensor means on said second load path forming means for sensing the forces and moments applied to the second load path forming means from which the total value of the forces and moments transferred from the input member to the output member may be determined while simultaneously transferring large moments and small forces.

According to a further aspect of the present invention there is provided a force moment sensor for sensing forces and moments in a system through which forces and moments are transferred from an input member to an output member comprising:

first and second coaxially arranged tubular members each having a proximal end and a distal end, the second tubular member being spaced inwardly from the first tubular member, the first tubular member forming a second load path and the second tubular member forming a first load path of the sensor, load distributing means connecting the proximal ends of the first and second tubular members whereby forces and moments applied to the load distributing means at a load junction formed between the load distributing means and the input member will be divided between the first and second tubular members, the first and second tubular members cooperating with one another and the load junction being located relative to the proximal ends of the first and second tubular members such that minor components of the moments and substantial components of the forces are transferred through the second load path forming means in use, and strain sensor means on said second tubular member for sensing the forces and moments applied to the second tubular member from which the total value of the forces and moments transferred from the input member to the output member through the sensor may be determined.

BRIEF DESCRIPTION OF THE DRAWINGS

The invention will be more clearly understood after reference to the following detailed specification read in conjunction with the drawings wherein.

DESCRIPTION OF THE PREFERRED EMBODIMENTS

Figure 1:
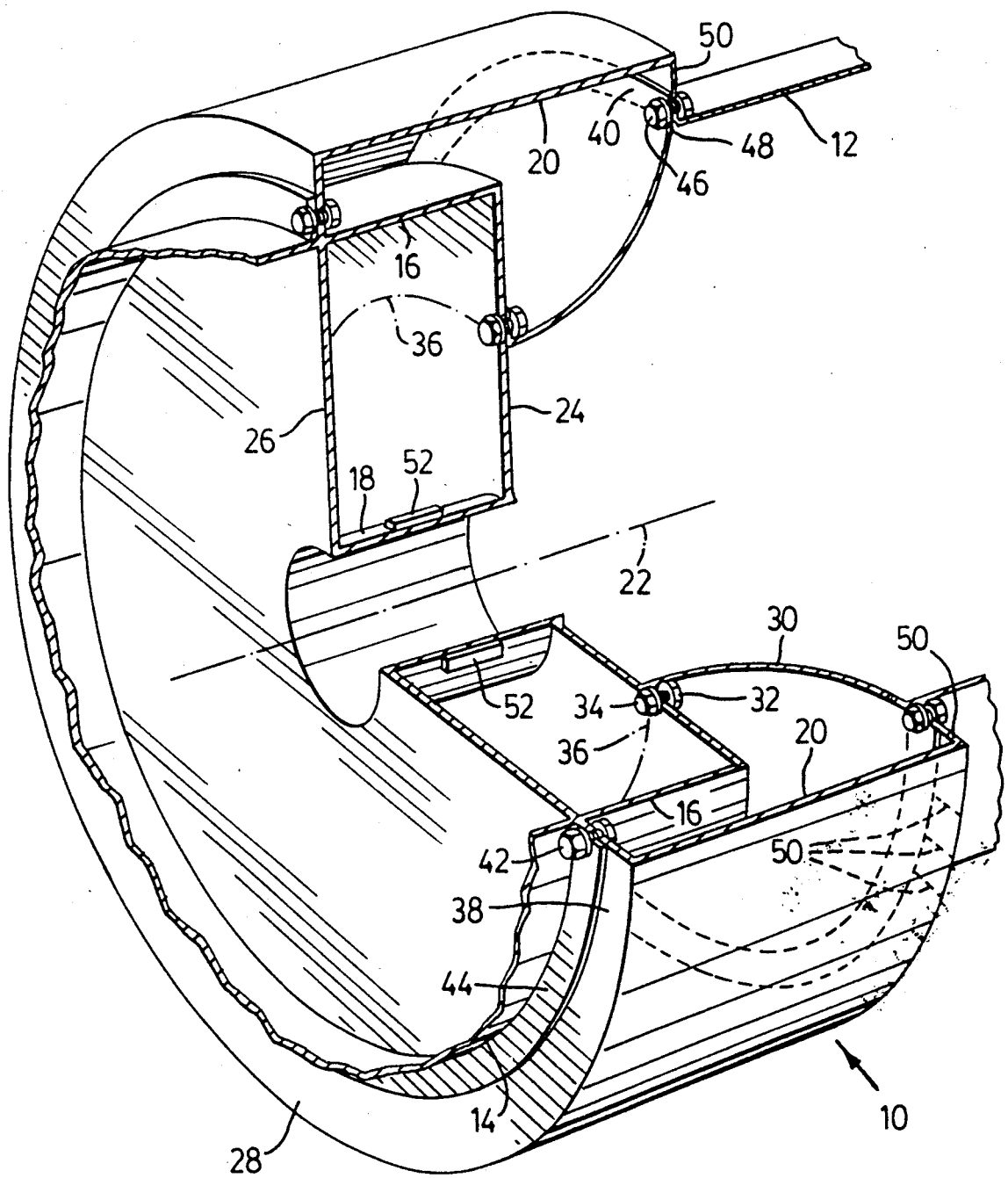
FIG. 1 is a partially sectioned pictorial view showing a force and moment sensor constructed in accordance with an embodiment of the present invention mounted between an input member and an output member.

With reference to FIG. 1 of the drawings, the reference number 10 refers generally to a force and moment sensor constructed in accordance with an embodiment of the present invention. The sensor 10 is mounted between a tubular input member 12 and a tubular output member 14. The tubular input member 12 may be in the form of a wrist joint and the tubular output member 14 may be in the form of the end effector of a remote manipulator such as the remote manipulator used in the shuttle orbiter.

The force and moment sensor 10 has a first load path forming member 16, a second load path formimg member 18 and a third load path forming member 20 all of which are in the form of tubular members which have a circular cross section arranged concentrically with respect to the central axis 22. A load distributing member 24 is in the form of a diaphragm and extends between the proximal ends of the first and second tubular members 16 and 18. A load transfer member 26 extends between the distal ends of the first and second tubular members 16 and 18. A flange 28 connects the load transfer member 26 and the second tubular member 16 to the distal end of the third tubular member 20. A transition member 30 is formed with a flange 32 which projects radially outwardly from the distal end thereof. The flange 32 is connected by means of nut and bolt fasteners 34 to the load distributing member 24 at points which are circumferentially spaced about a load junction which is arranged concentrically with respect to the axis 22 and is identified by the reference numeral 36. It will be noted that the load junction 36 is spaced radially inwardly from the first load path forming member 16 and radially outwardly from the second load path forming member 18.

A flange 38 projects radially outwardly from the junction of the outer edge of the load transfer member 26 and the distal end of the first load path forming member 16. The flange 38 is connected to the distal end of the third path forming member 20. A flange 40 is formed at the proximal end of the transition member 30.

Nut and bolt fasteners 42 serve to connect the flange 44 which is located at the proximal end of the output member 14 to the flange 38. Similarly, nut and bolt fasteners 46 serve to connect the flange 40 of the transition member to a flange 48 which is located at the distal end of the input member 12.

A plurality of struts 50 are arranged at circumferentially spaced intervals about the proximal end of the third load path forming member 20 and extend radially inwardly to and are connected to the flange 40. The struts 50 are pivotally pinned to the proximal end of the third load path forming member 20 and to the flange 40 for pivotal movement about axes which extend parallel to the central axis 22.

A plurality of strain gauges 52 are mounted on the second load path member 18. The strain gauges 52 are in the form of transducers that respond to the strain detected in the second load path forming member and may be used to generate a signal which indicates the magnitude of the forces and moments applied to the second load path forming member 18 in use.

Figure 2:
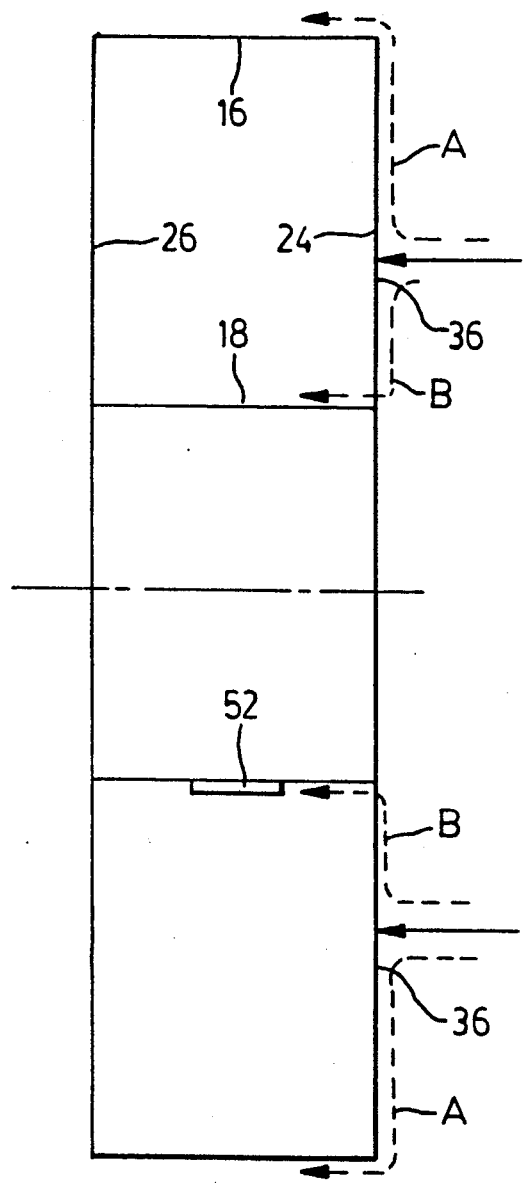
FIG. 2 is a diagrammatic cross-sectional view of a simple force moment sensor constructed in accordance with a further embodiment of the present invention.

FIG. 2 of the drawings illustrates diagrammatically in a simplified form the manner in which the force moment sensor operates in use. In this embodiment, the sensor has the first and second load path forming members 16 and 18 once again connected at their proximal ends by means of a load distributing member 24 and connected at their distal ends by a load transfer member 26, the first and second load path forming members 16 and 18 are tubular and have a circular cross-section. The load distributing member 24 and the load transfer member 26 are in the form of annular discs. Forces and moments are applied to the load distributing member 24 through the load junction 36. These forces and moments are distributed between the first and second load path forming means 16 and 18 as diagrammatically shown in FIG. 2 by the broken lines A and B. By locating the first load path forming member 16 radially outwardly and the second load path forming member 18 radially inwardly from the junction 36 and by constructing the second load path forming member 18 so that it is less rigid than the first load path forming member 16, it is possible to ensure that a major component of the moments applied at the load junction will be distributed to the first load path forming member while a substantial amount of the forces applied at the load junction may also be carried by the second load forming member 18. As a result, the sensors 52 are only subjected to a minor component of the moments applied at the load junction and are therefore protected against damage resulting from overloading while a substantial proportion of the forces applied at the load junction are directed through the second load path forming member 18 such that even low force loads may be detected by the sensors 52.

The force moment sensor previously described with reference to FIG. 1 is distinguished from the sensor which is diagrammatically illustrated in FIG. 2 of the drawings by the provision of the third load path forming member 20 and the struts 50 which connect the proximal end of the third load path forming member 20 to the power input shaft 12. This structure permits the force moment sensor to be used when relatively large moments are applied by the input shaft 12 as will be described hereafter.

Figure 4:
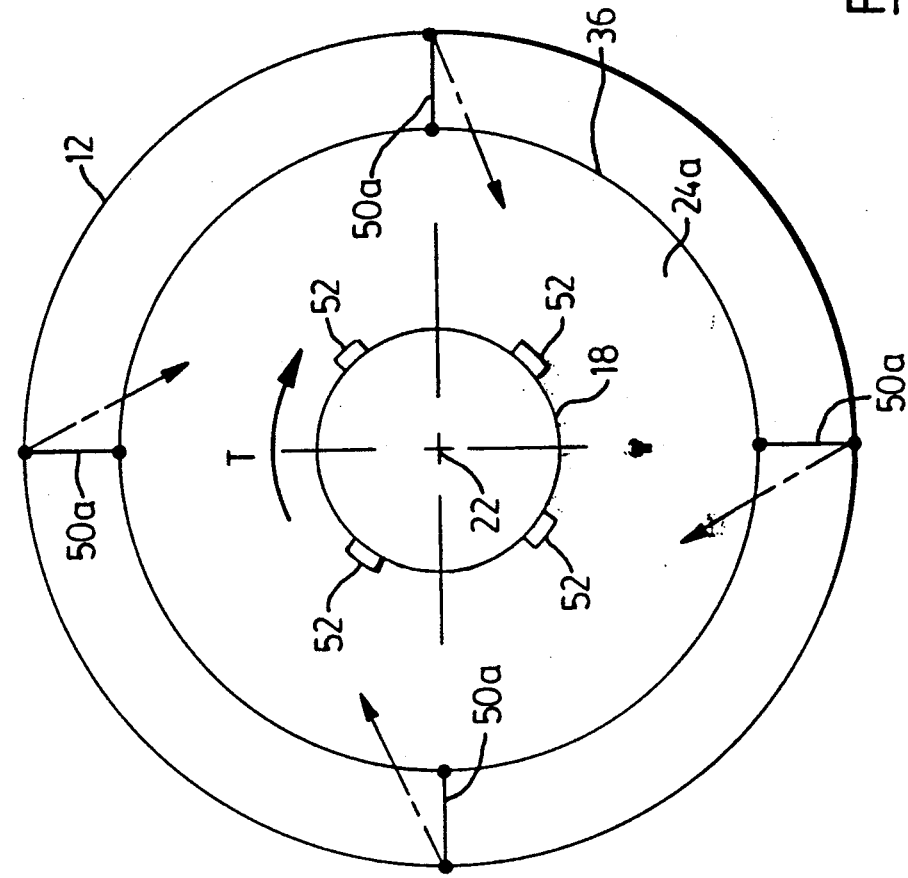
Figure 3:
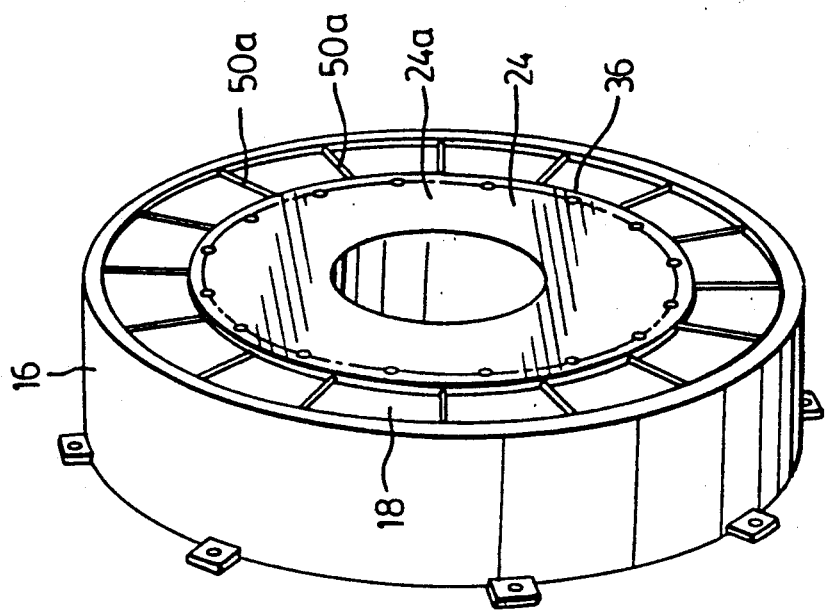
FIG. 3 is a pictorial view of a force moment sensor constructed in accordance with a further embodiment of the present invention.

A further embodiment of the present invention is illustrated in FIG. 3 and 4 of the drawings wherein like numerals apply to like parts to those identified in FIG. 1. In this embodiment, the load distributing member which is generally identified by the reference numeral 24 comprises a diaphragm 24a which is in the form of an annular disc and a plurality of struts 50a. The diaphragm 24a has its inner edge secured to the second load path forming member 18 and the struts 50a serve to connect the outer edge of the diaphragm 24a to the proximal end of the first load path forming member 16. In this embodiment the load junction 36 is formed along the outer peripheral edge of the diaphragm 24a.

As diagramatically shown in FIG. 4, the struts 50a connect the diaphragm 24a to the outer shell or tubular input members 12 at the load junction 36. The struts 50a are only capable of transferring load between the diaphragm 24a and the input member 12 in a direction aligned with the longitudinal axis of each strut 50a. In an unloaded condition, tho direction that load can pass is the radial direction with respect to axis 22. Thus the only load which can be carried by outer shell 12 for a small amplitude load is a load transverse to axis 22. All other small amplitude load types (moment, torsion or load) along axis 22 will be carried entirely by the second load path forming means or inner shell 18 thereby producing maximum output at transducers 52.

As the amplitude of the load at the load junction 36 increases, the struts 50a will begin to rigidly move such that they are no longer aligned in a radial direction. This realignment will require that their length increase slightly in response to a torsion load T as shown in FIG. 4. The combined effect of stretching of struts 50a and their realignment will mean that some portion of all loads will begin to pass through outer shell 12 and conversely a smaller portion of the load will pass through inner shell 18 thereby producing smaller output increases at transducers 52. Progressive increases in applied load level will cause increased realignment of the struts and increased axial loads in the struts. These effects will mean that smaller and smaller portions of the total load increase will pass through inner shell 18.

The net effect of such a non-linear increase in transducer 52 output for increase in applied load is:

I. A system which is most sensitive and accurate for small load applications.

II. A system which becomes stiffer as load level increases.

These and other modifications of the present invention will be apparent to those skilled in the art.

I claim:

1. A force and moment sensor for sensing forces and moments in a system through which forces and moments are transferred from an input member to an output member comprising:

first and second load path forming means forming first and second load paths for transferring said forces and moments from the input member to the output member, said first load path forming means being spaced radially outwardly from the second load path forming means and being connected thereto by a load distributing member which extends radially therebetween, attachment means on the load distributing member for attaching the input member thereto, said attachment means being radially spaced from the first and second load path forming means such that said first and second path forming means cooperate with one another to divide the forces and moments which are transferred through the sensor whereby minor components of the moments and substantial components of the forces are transferred through the second load path forming means, and strain sensor means on said second load path forming means for sensing the forces and moments applied to the second load path forming means from which the total value of the forces and moments transferred from the input member to the output member may be determined while simultaneously transferring large moments and small forces.

2. A force and moment sensor as claimed in claim 1 wherein said first and second load path forming means each having a proximal end and, said load distributing member comprises a diaphragm that extends radially between the proximal ends of the first and second load path forming means.

3. A force and moment sensor for sensing forces and moments in a system through which forces and moments are transferred from an input member to an output member comprising:

first and second coaxially arranged tubular members each having a proximal end and a distal end, the second tubular member being spaced inwardly from the first tubular member, the first tubular member forming a second load path and the second tubular member forming a first load path of the sensor, load distributing means connecting the proximal ends of the first and second tubular members, and load junction located between the load distributing means and the input member and radially spaced from the first and second tubular member, said load distributing means including load transfer beams extending between the load junction and the first tubular member, the first and second tubular members and said load transfer beams cooperating with one another and the load junction being located relative to the proximal ends of the first and second tubular members such that minor components of the moments and substantial components of the forces are transferred through the second load path forming means in use, and strain sensor means on said second tubular member for sensing the forces and moments applied to the second tubular member from which the total value of the forces and moments transferred from the input member to the output member through the sensor may be determined.

4. A force and moment sensor for sensing forces and moments in a system through which forces and moments are transferred from an input member to an output member comprising:

first and second coaxially arranged tubular members each having a proximal end and a distal end, the second tubular member being spaced inwardly from the first tubular member, the first tubular member forming a second load path and the second tubular member forming a first load path of the sensor, load distributing means connecting the proximal ends of the first and second tubular members whereby forces and moments applied to the load distributing means at a load junction formed between the load distributing means and the input member will be divided between the first and second tubular members, the first and second tubular members cooperating with one another and the load junction being located relative to the proximal ends of the first and second tubular members such that minor components of the moments and substantial components of the forces are transferred through the second load path forming means in use, and strain sensor means on said second tubular member for sensing the forces and moments applied to the second tubular member from which the total value of the forces and moments transferred from the input member to the output member through the sensor may be determined, the input member being a tubular member which has a diameter that is greater than the diameter of the load junction, said sensor means further comprising a transition member which has a proximal end for connection to the input member and a distal end connected to the load distributing means at the load junction, the transitional member having a diameter that decreases progressively from the input member to the load junction.

5. A force and moment sensor for sensing forces and moments in a system through which forces and moments are transferred from an input member to an output member comprising:

first and second load path forming means forming first and second load paths for transferring said forces and moments from the input member to the output member, said first and second path forming means cooperating with one another to divide the forces and moments which are transferred through the sensor whereby minor components of the moments and substantial components of the forces are transferred through the second load path forming means, and strain sensor means on said second load path forming means for sensing the forces and moments applied to the second load path forming means from which the total value of the forces and moments transferred from the input member to the output member may be determined while simultaneously transferring large moments and small forces, a third load path forming means forming a third load path for transferring high loads from the input member to the output member, said third load path forming means having radially extending struts that serve to substantially deactivate the third load path forming means until a relatively large load is applied to the system in use.

6. A force and moment sensor for sensing forces and moments in a system through which forces and moments are transferred from an input member to an output member comprising:

first and second coaxially arranged tubular members each having a proximal end and a distal end, the second tubular member being spaced inwardly from the first tubular member, the first tubular member forming a second load path and the second tubular member forming a first load path of the sensor, load distributing means connecting the proximal ends of the first and second tubular members whereby forces and moments applied to the load distributing means at a load junction formed between the load distributing means and the input member will be divided between the first and second tubular members, the first and second tubular members cooperating with one another and the load junction being located relative to the proximal ends of the first and second tubular members such that minor components of the moments and substantial components of the forces are transferred through the second load path forming means in use, and strain sensor means on said second tubular member for sensing the forces and moments applied to the second tubular member from which the total value of the forces and moments transferred from the input member to the output member through the sensor may be determined, said load distributing means comprising an annular diaphragm that is connected to the proximal end of the second tubular member and projects radially outwardly therefrom to an outer peripheral edge that is spaced radially inwardly from the proximal end of the first tubular member and a plurality of struts extending between the outer peripheral edge of the annular diaphragm and the proximal end of the first tubular member.

7. A sensor as claimed in claim 6 wherein the struts are pivotally connected to and extend radially between the diaphragm and the first tubular member.

* * * * *